(12) United States Patent
Lynch

(10) Patent No.: US 9,965,134 B2
(45) Date of Patent: May 8, 2018

(54) METHOD AND APPARATUS FOR PROVIDING A USER INTERFACE FOR A FILE SYSTEM

(75) Inventor: David M. Lynch, Dripping Springs, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 532 days.

(21) Appl. No.: 13/620,122

(22) Filed: Sep. 14, 2012

(65) Prior Publication Data

US 2014/0082558 A1 Mar. 20, 2014

(51) Int. Cl.
*G06F 3/048* (2013.01)
*G06F 3/0481* (2013.01)
*G06F 9/44* (2018.01)

(52) U.S. Cl.
CPC .......... *G06F 3/0481* (2013.01); *G06F 9/4443* (2013.01)

(58) Field of Classification Search
CPC ............... G06F 3/04845; G06F 3/0481; G06F 3/04817; G06F 3/0482
See application file for complete search history.

(56) References Cited

U.S. PATENT DOCUMENTS

| | | | | |
|---|---|---|---|---|
| 5,548,745 A * | 8/1996 | Egan | ...................... | G06F 9/4443 703/27 |
| 5,572,648 A * | 11/1996 | Bibayan | .............. | H04M 1/2477 715/825 |
| 5,912,666 A * | 6/1999 | Watson | ................. | G06F 3/0481 708/303 |
| 7,596,762 B1 * | 9/2009 | Sazhin | ................ | G06F 3/04845 715/835 |
| 2007/0226650 A1 * | 9/2007 | Hintermeister | ......... | G06F 3/048 715/822 |
| 2008/0115064 A1 * | 5/2008 | Roach | ................. | G06F 3/04817 715/730 |
| 2010/0245852 A1 * | 9/2010 | Fujita | .................... | G06F 3/1205 358/1.2 |
| 2010/0257479 A1 * | 10/2010 | Do | ........................ | G06F 9/4446 715/780 |
| 2012/0304119 A1 * | 11/2012 | Hoogerwerf | ...... | G06F 17/30126 715/810 |
| 2013/0061127 A1 * | 3/2013 | Reyes | ................. | G06F 17/3089 715/234 |
| 2013/0282755 A1 * | 10/2013 | Procopio | ........... | G06F 17/30126 707/770 |
| 2014/0075304 A1 * | 3/2014 | Bailey | .................... | G09B 19/00 715/705 |

* cited by examiner

*Primary Examiner* — Jeffrey A Gaffin
*Assistant Examiner* — Justin S Lee
(74) *Attorney, Agent, or Firm* — Faegre Baker Daniels LLP

(57) ABSTRACT

A method and apparatus provides a user an interface for a file system. In one example, the method and apparatus displays the file as a visualized object, e.g., a graphical representation of the file as a real life object, receives selection of visualized objects and activates data elements represented by the visualized objects. The visualization of the file may be determined based on visualizer identification information associated with the file. For the activated data elements, the method and apparatus displays tool interfaces, in combination with the visualized objects. The tool interfaces may be selectively displayed for the activated data element base on tool identification information associated with a data type of the data element. Furthermore, the method and apparatus can process the activated data elements using the selected tool actions from different programs.

17 Claims, 12 Drawing Sheets

| VISUALIZER ID LOOKUP TABLE | |
|---|---|
| DATA TYPE 1 | ID INFO FOR VISUALIZER THAT CAN VISUALIZE A FILE HAVING DATA TYPE 1 |
| DATA TYPE 2 | ID INFO FOR VISUALIZER THAT CAN VISUALIZE A FILE HAVING DATA TYPE 2 |
| DATA TYPE 3 | ID INFO FOR VISUALIZER THAT CAN VISUALIZE A FILE HAVING DATA TYPE 3 |
| ... | ... |
| DATA TYPE N | ID INFO FOR VISUALIZER THAT CAN VISUALIZE A FILE HAVING DATA TYPE N |

FIG. 2-1

TOOL INTERFACE ID LOOKUP TABLE ~202

| | 252 | 254 |  |  |
|---|---|---|---|---|
| DATA TYPE 1 ~250 | ID INFO FOR PROG 1 | INFORMATION OF GRAPHICAL DATA DEFINING TOOL INTERFACES OF PROG1 | | |
| | ID INFO FOR PROG2 | INFORMATION OF GRAPHICAL DATA DEFINING TOOL INTERFACES OF PROG2 | | |
| | : | : | | |
| | ID INFO FOR PROG : N | INFORMATION OF GRAPHICAL DATA DEFINING TOOL INTERFACES OF PROGN | | |

· · · · · · ·

| | | |
|---|---|---|
| DATA TYPE N | ID INFO FOR PROG 1 | INFORMATION OF GRAPHICAL DATA DEFINING TOOL INTERFACES OF PROG1 |
| | ID INFO FOR PROG2 | INFORMATION OF GRAPHICAL DATA DEFINING TOOL INTERFACES OF PROG2 |
| | : | : |
| | ID INFO FOR PROG : N | INFORMATION OF GRAPHICAL DATA DEFINING TOOL INTERFACES OF PROGN |

FIG. 2-2

METHOD AND APPARATUS FOR PROVIDING A USER INTERFACE FOR A FILE SYSTEM

BACKGROUND OF DISCLOSURE

The disclosure relates generally to a method and apparatus for providing an interface for a user interacting with a file system.

Modern computer user interfaces (UI) allow humans to interact productively with information machines and have seen progress from punch cards, to command-line interpreters, to 2D windowed interfaces. The root of the interface found on all of today's desktop computers originated in the 1970's but the interaction has remained fundamentally the same since. There have been improvements in UI features, appearance, and speed, but the underlying method in which a human uses a desktop computer remains accomplished through a keyboard and mouse, manipulating 2D windows that contain the user's information. User data is hidden in windows behind other windows, and accessed via clicking on icons and click-intensive dropdowns, list boxes and scrollbars.

In the traditional 2D window model, a file icon represents a file connected to a file system. This model is "application-centric" because data included in a file must be manipulated within software applications. By double clicking on a file icon, a separate (typically "thick") software application launches and the data in the file is manipulated within that software application. The software application will have an exclusive control of the data until the software application is closed, i.e. other software applications cannot process the data in parallel. Alternatively, a thick application is launched and then data is "opened" from within this application. Under this model, the resulting modified data set has a limited capability to convey its new contents via the simple 2D icon, i.e. the 2D icon may not reflect the new content after the data is modified by a thick application. Moreover, in a situation where the data needs to be manipulated by multiple thick applications, the manipulations need to occur in series, one at a time.

Another problem associated with the traditional 2D windows model is that it requires a user to have knowledge about software applications' capability to process data of a particular data type. For example, to manipulate JPEG data, a user must know which applications installed on the system provide tool actions that can process JPEG data. However, novice users are often not equipped with that type of knowledge.

As an improvement, some operating systems, like Microsoft Windows™, associate a data type (e.g. txt, mov, mpeg, JPEG, etc) with a default application. Under that approach, the OS will automatically launch the default application corresponding to the data type of the data selected by the user to process such data if the user does not launch an application on user's own. However, the drawback associated with this approach is inflexibility such that, absent user's selection of an application, the OS can only provide the user the default application to process the data. In certain circumstances, the user may not wish to use the default application to process the data even though the user does not know of any other applications available to process the data. For example, the default application may not provide desired or adequate functions to process the data in a way the user prefers.

Even for users having knowledge of a set of software applications that can process data of particular data type, such users may still have to launch every application of the set to determine which of these applications provides the most suitable tool action for a particular purpose. For example, a user may know several text editing programs are available to edit the user data, but the user may not know which program provides the most suitable editing capability to achieve the user's purpose. To find the most suitable tool action, the user will need to launch every such text editing program, explore through a plurality of tool interfaces provided by the text editing program, e.g. menu bars, tool bars, etc, and determine which program provides the most suitable tool action to process the data. This can become a very cumbersome practice for the user especially when there are multiple tool interfaces in each program.

Microsoft Windows™, Apple Macintosh™ and Linux operating systems are a few well-known examples of the traditional 2D window model. In these systems, to process data in such an application-centric scheme, the user needs to know which application may process the data of one or more selected files, and which tool action provided by one of such applications may be most suitable for user's purpose to process the data. Accordingly, the user may have to take some time and effort to discover a desired tool action suitable to process the data of a file connected to a file system.

As an improvement, file visualizers have been implemented to provide a preview of content of a file connected to a file system. For example, for a file with a JPEG file type, i.e. an image file; an appropriate file visualizer will display a preview of the image, e.g. a reduced sized actual image, in a preview window visible in a file manager provided by the OS. This provides the user an intuitive way to learn the content of a file. However, to determine which program provides the most suitable tool action to process the data of the file, the user may still wish to know about all available installed software applications that can process the data of the file.

Accordingly, there exists a need for improved methods and apparatus for providing an interface for a user to interact with a file system in order to address one or more problems mentioned above.

BRIEF DESCRIPTION OF DRAWINGS

The embodiments will be more readily understood in view of the following description when accompanied by the below figures and wherein like reference numerals represent like elements, wherein:

FIG. 2-1 is a block diagram illustrating one example of a visualizer identification lookup table;

FIG. 2-2 is a block diagram illustrating one example of a tool interface identification lookup table;

DETAILED DESCRIPTION

Figure 1:
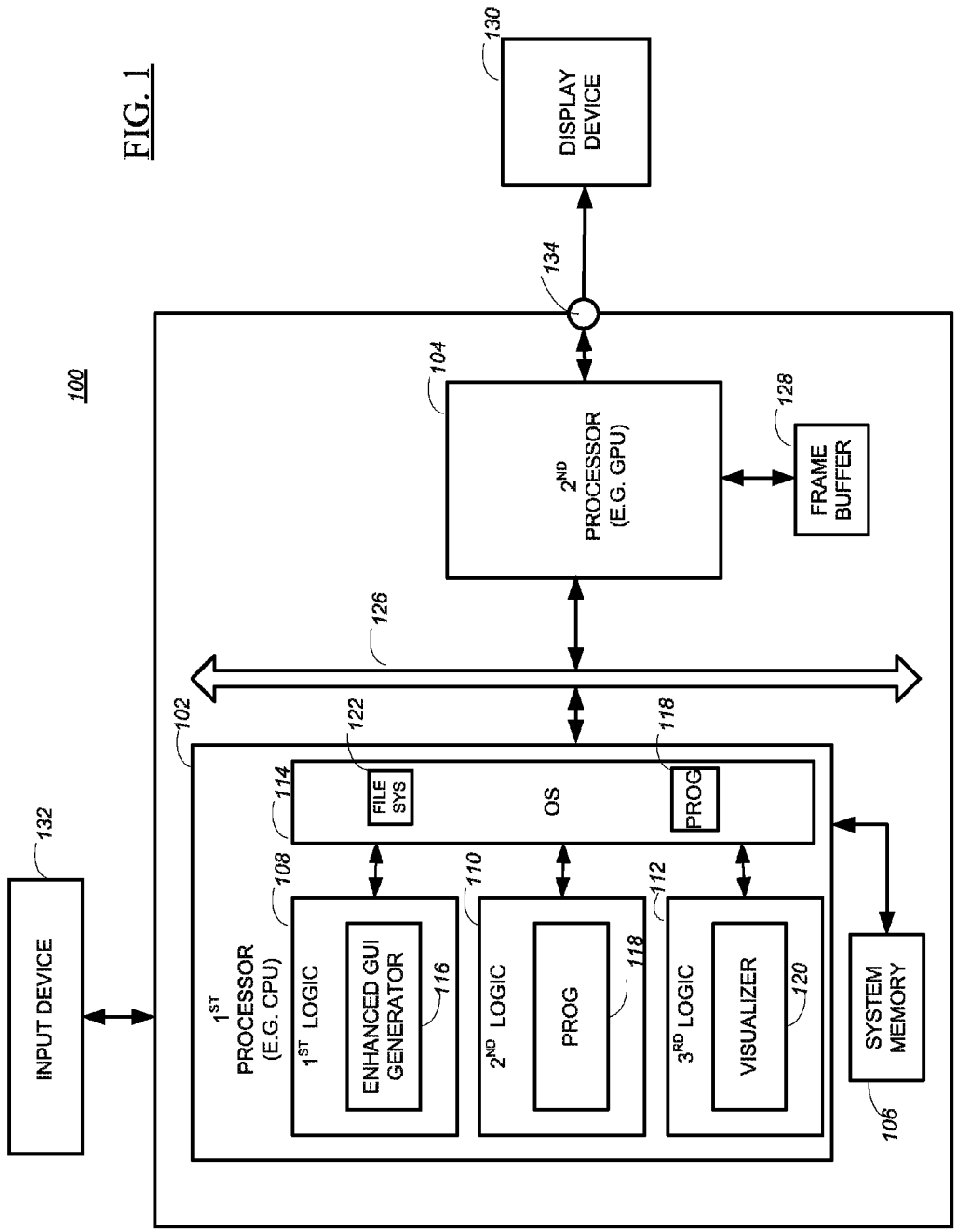
FIG. 1 is a block diagram illustrating one example of an apparatus for providing an interface for a user to work with at least one file connected to a file system.

Briefly, in one example, a method and apparatus for providing an interface for a user to work with one or more files connected to a file system displays the files as visualized objects using a visualizer, receives activation for the visualized object, activates one or more data elements of the file represented by the activated visualized object, and displays, in combination with the visualized object, tool interfaces associated with one or more different programs. A data element is a block of data with a specific data type. A data element may not be divided any further into sub-blocks having a different data type or data types. For example, a picture may be a data element because it cannot be further divided into sub-blocks having a different data type. By contrast, a Microsoft Word™ document may not be a data element in some instances because it may be further divided into sub-blocks of data having different types other than Microsoft Word™. For example, a Microsoft Word™ document may contain JPEG, text, graph data. In these example cases, the Microsoft Word™ document is a file containing multiple data elements, logically grouped together with a corresponding file type, i.e. doc. A rich text file (RTF) is another example of a file having one or more data elements (e.g. the RTF file may contain txt data elements and/or graphic data elements). A visualizer is a program that can be used to visualize data, i.e. to represent data in appropriate graphical form. A visualizer may be provided by operating system (OS) or may be installed by a user. The visualizer used to display a particular file as a visualized object is selected based on visualizer identification information associated with the file. The disclosed method and apparatus visualizes a file as a visualized object—i.e. a visualized representation of a file based on the content of the file. For example, a text file with multiple pages may be visualized as laid out in a space with the far-way pages may be displayed in reduced sizes to create a correct user perspective of the pages. In another example, a music file may be visualized by the total sound waveform with preferred cover art. The tool interfaces displayed for one or more activated data elements are determined based on data type or data types of the one or more activated data elements and different programs identified as capable of processing data having the data type or data types. A tool interface of a program may comprise representations of tool actions associated with the program, for example, a graphical tool bar comprising a number of tool icons indicating different editing actions provided by a text editing program, such as inserting text, deleting text, increasing font size, etc. A tool action provided by a program may be any executable instructions that when executed by one or more processor causes the one or more processors to perform operations of the tool action, such as text editing, graphics editing, internet browsing, remote communication, etc. It is understood that a tool action may also be provided by the OS, such as, for example, copy, delete, search, find, etc.

Among other advantages, for example, the method and apparatus provides an intuitive interface that is data-centric and allows a user to process data in a file connected to a file system using one or more tool actions from different programs without having knowledge about available tool actions to process the data. In contrast to an application-centric interface, the data-centric interface provides a user with an environment where data may be directly manipulated by different programs. Instead of requiring the user to launch and explore for desired tool actions provided by the different programs under the traditional 2D window model described above, the method and apparatus intelligently determines relevant tool interfaces provided by different programs to be displayed in combination with the activated data element or elements and exposes tool actions in the determined tool interfaces all at once to the user. Thus, the method and apparatus provides a more intuitive and user-friendly interface for user to work with files connected to a file system, thereby improving user experience with the file system.

The method and the apparatus determine tool interfaces to be displayed for one or more activated data elements based on tool identification information. The tool identification information may comprise data defining an association between a data type of the activated data elements and a plurality of different programs, which are indentified as being capable of processing data having the data type.

The method and apparatus may also receive selection of a plurality of visualized objects, e.g. a lasso or multi-select action as generally known in the art. In response to such selection, the method and apparatus may then activate data elements represented by the activated visualized objects and display, in combination with the visualized objects, a common set of tool interfaces for the activated data elements based on tool identification information associated with data types of the activated data elements.

The method and apparatus may also receive a selection of a tool icon from a plurality of tool interfaces displayed for the activated data element. The selected tool icon represents a tool action associated with a program identified by the tool identification information as being capable of processing data having a data type of the activated data element. In response to the selection of the tool action, the method and apparatus then manipulates the activated data element using the selected tool action.

In one example, the method and apparatus manipulates the data element by giving a control of the activated data element to a program whose tool action is selected. The method and apparatus may allow the program to process the activated data element using the selected tool action until the program finishes processing the data element. Accordingly, once the program finishes processing the activated data element, the method and apparatus retains the control of the data element from the program. The method and apparatus may then refresh a view of the activated visualized object based on a result of the program's processing of the data element.

In another example, the method and apparatus displays multiple tool interfaces based on a determination of a user's prior usage of programs to process a data element represented by the activated visualized object. The method and apparatus may also display multiple tool interfaces based on configuration information that configures a preference of processing the data element represented by the activated visualized object.

In still another example, the method and apparatus updates the tool identification information by obtaining data indicating a program's ability to process data having a data type. The tool identification information may also be updated by user's configuration.

In yet another example, the method and apparatus may receive selection of multiple tool icons to process one or more activated data elements. In response to such selection, the method and apparatus manipulates the activated data elements using programs whose tool actions are selected by the selection of the multiple tool icons.

Also among other advantages, the method and apparatus processes one or more data elements using tool actions from different programs without requiring a user to process the data elements in each of the different programs serially, i.e. repeating launching, processing, and closing of every such program in a serial sequence. This provides the ability to process the data elements in a parallel processing fashion from a user's perspective, whereas under the traditional 2D window model approach each running program exclusively controls the data element until the user closes the program. Thus, the proposed technique can improve user experience by providing a more efficient and intuitive multi-program processing of the data elements without the need for the user to repeat launching, processing, and closing of every such program in a serial sequence. Other advantages will be recognized by those of ordinary skill in the art.

FIG. 1 illustrates one example of an apparatus 100 providing an interface for a user to work with at least one file connected to a file system. The apparatus 100 may be any suitable device, for example, a laptop computer, desktop computer, media center, handheld device (e.g., mobile or smart phone, tablet, etc.), gaming console, set top box, printer or any other suitable device, to name a few. In this example, the apparatus 100 employs a display device 130, a first processor 102, operatively connected to a system memory 106, a second processor 104 operatively connected to a frame buffer 128, and data buses or point to point connections, such as system bus 126, which transfer data between each structure of the apparatus 100. The apparatus 100 may also include input device 132, such as a computer mouse, trackball, touchpad, digitizing tablet, touchscreen, joystick, pointing stick, keypad, keyboard, camera, remote controller or any other suitable device. Any other suitable structure, such as but not limited to a storage device or a controller, may also be included in the apparatus 100.

In this example, the first processor 102 is a host central unit (CPU) having multiple cores however any suitable processor may be employed including a DSP, APU, GPGPU or any other suitable processor or logical circuitry. The CPU 102 is bi-directionally connected to other components of the apparatus 100 via the system bus 126 as generally known in the art. The second processor 104 may be a graphics processing unit (GPU), which drives the display device 130 via the display connector 134, such as analog display connectors, for example, composite video, S-Video, VGA, digital display connectors, for example, HDMI, mini-DVI, micro-DVI, wireless connectors or any other suitable connectors. It is understood that, in some other examples of apparatus 100, the first processor (e.g., CPU) 102 may be integrated with the second processor 104 to form a general processor. In addition, although the system memory 106 and the frame buffer 128 are shown in FIG. 1 as discrete memory devices, it is also understood that a unified memory architecture that can accommodate all the processors may also be employed in some other examples of apparatus 100.

The display device 130 may be any suitable physical displays known in the art, such as but not limited to liquid crystal display (LCD), light-emitting diode (LED) display, organic LED (OLED) displays, cathode ray tube (CRT) display, plasma display, projector screen, electroluminescent displays, vacuum fluorescent (VF) display, laser display, E-ink display or any other suitable displays, to name a few. The second processor 104 may generate one or more display surfaces (image frames) in the frame buffers 128 and present them on the display device 130. It is understood that, although one display device 130 is shown in FIG. 1, the apparatus 100 may include any desired number of display devices.

In this example, as shown, the first processor 102 employs first logic 108 having an enhanced graphical user interface (GUI) generator 116, second logic 110 having a program 118, and third logic 112 having a visualizer 120. The logic 108, 110, 112 referred to herein is any suitable executing software module, hardware, executing firmware or any suitable combination thereof that can perform the desired function, such as programmed processors, discrete logic, for example, state machine, to name a few. It is further understood that the logic 108, 110, 112 may be included in the first processor 102 as part of the first processor 102, or a discrete component of the apparatus 100 that can be executed by the first processor 102, such as software programs stored on computer readable storage medium that can be loaded into the apparatus 100 and executed by the CPU 102. It is also understood that the logic 108, 110, 112 may be combined in some other examples to form an integrated logic that performs desired functions of the logic 108, 110, 112 as described herein. It is further understood that for illustration clarity only one program and visualizer are shown in FIG. 1, but in some other examples of apparatus 100 the processor 102 may employ any desired number of logic having one or more programs and/or visualizers. The logic 108, 110, 112 may communicate with structures in the apparatus 100 such as but not limited to the input device 132, the system memory 106, and the second processors 104.

Also shown in this example is an operating system (OS) 114. The OS 114 may be any suitable structure or executable instructions that when executed cause a processor, e.g. the processor 102, to manage hardware resources and provide common services for software running on devices, such as but not limited to, desktop computers, laptops, smart phones, tablet devices servers, digital televisions and any other suitable devices. In this example, the OS 114 includes a file system 122, which, among other things, organizes, manages control of, retrieve and update data of, one or more files located on one or more suitable storage devices connected to the file system 122. In this example as shown, the OS 114 may also include at least one program 118, such as an OS embedded program like copy, search, delete, etc as generally known in the art. It is understood that, although the enhanced GUI generator 116 and the OS 114 are shown as discrete components of the processor 102 in FIG. 1, in some other examples the enhanced GUI generator 116 may be combined with OS 114 to form, e.g., an enhanced GUI generating OS as described herein. Likewise, the visualizer 120 in some other examples may also be combined with the OS 114 to form an OS that can visualize files connected to and managed by the file system 122. The OS 114 may communicate with logic 108, 110, 112 or other structure and software programs running on the processor 102.

Figure 2:
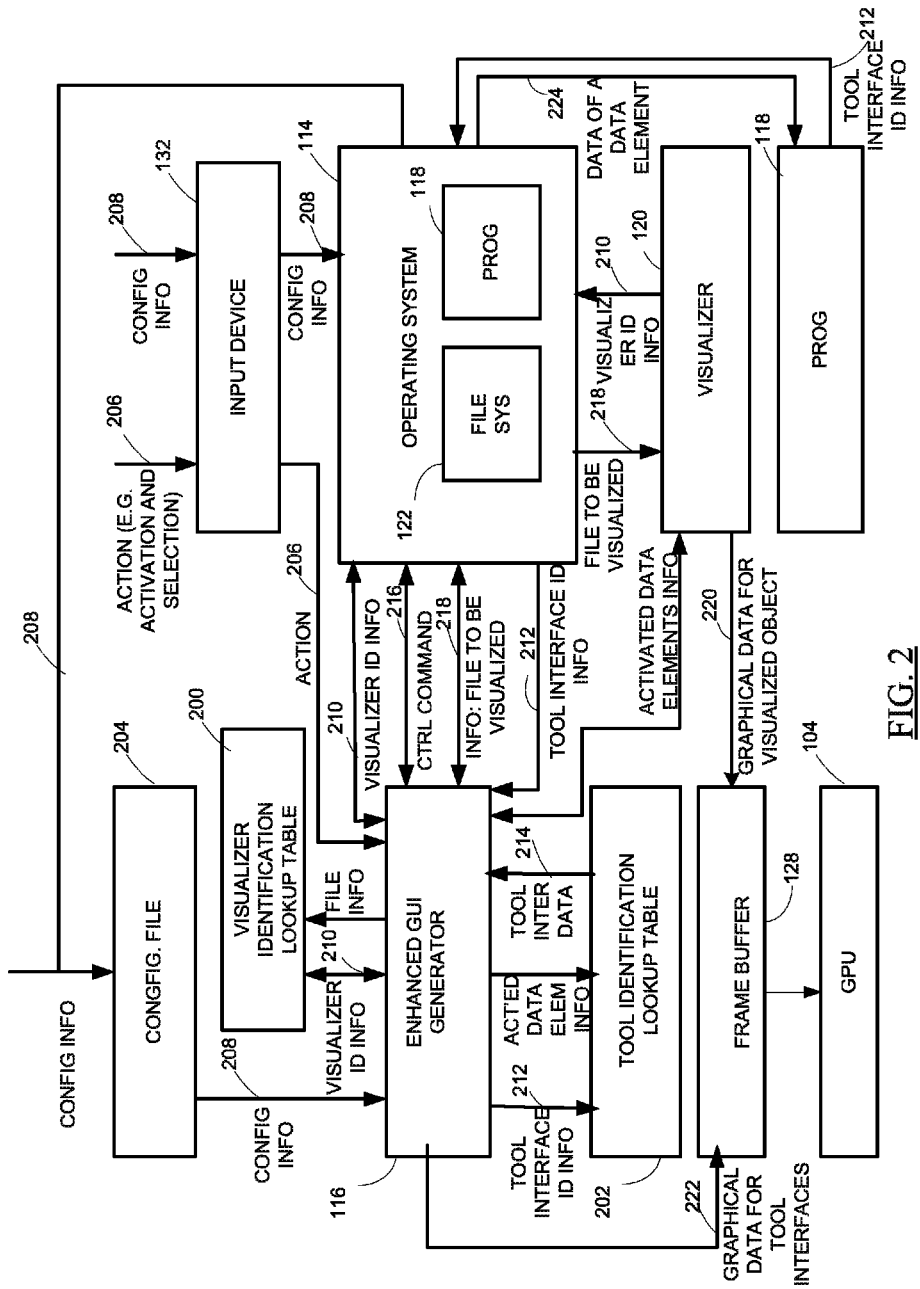
FIG. 2 is a block diagram illustrating the apparatus for providing an interface for a user to work with at least one file connected to a file system shown in FIG. 1.

FIG. 2 illustrates one example of an apparatus for providing an interface for a user to work with at least one file connected to a file system. The apparatus 100 includes the logic 108 having the enhanced GUI generator 116, the logic 112 having the visualizer 120. In this example, the enhanced GUI generator 116 and visualizer 120 may be application software provided by the logic 108 and 120 respectively running on the CPU 102. In some other examples, it is understood that the enhanced GUI generator 116 and visualizer 120 may be combined to form general application software. Also as noted above, in some other examples, the enhanced GUI generator 116 and visualizer 120 may be components included in an OS.

Figure 6:
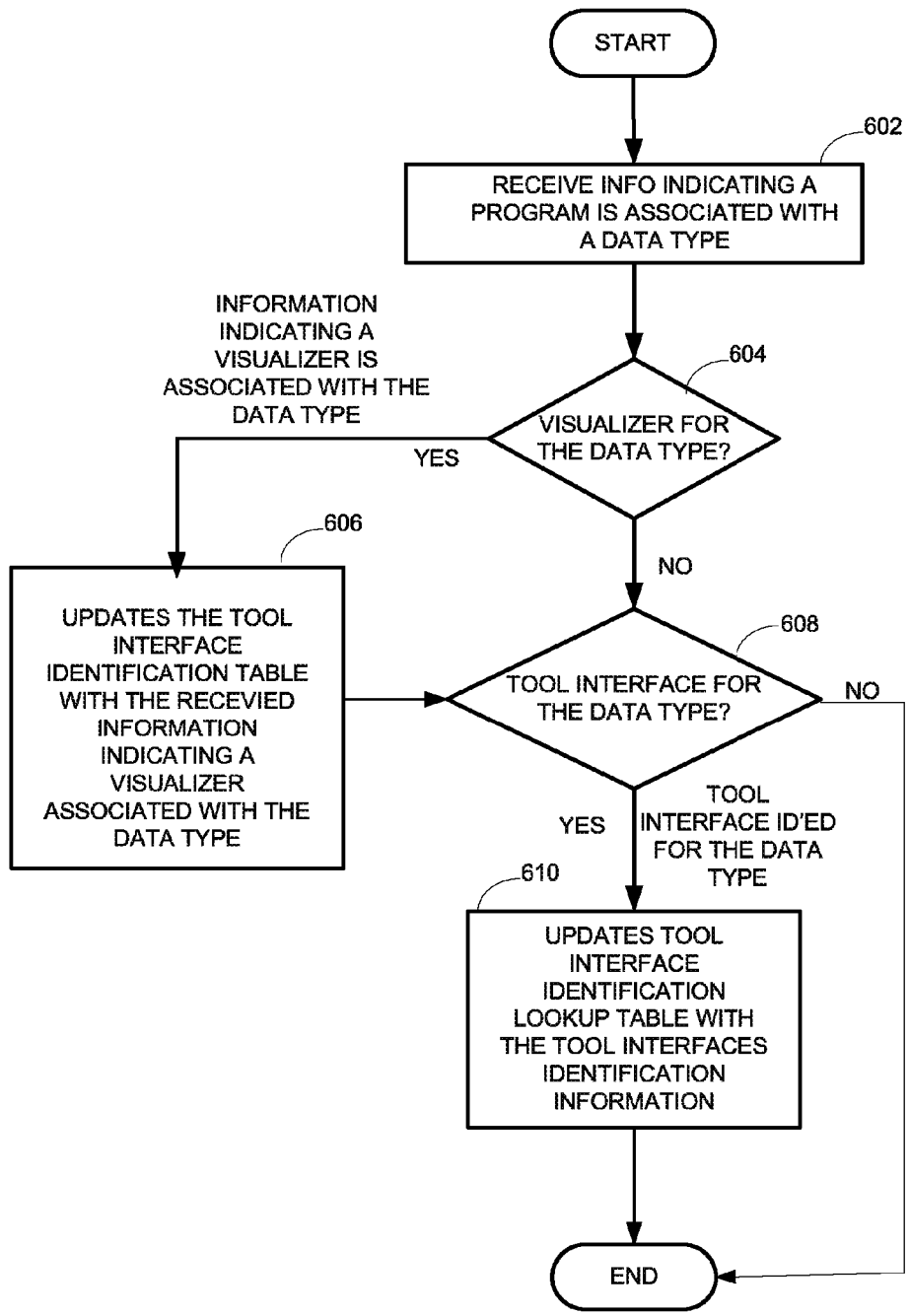
FIG. 6 is a flowchart illustrating still another example of a method for providing an interface for a user to work with at least one file connected to a file system.

The enhanced GUI generator 106 is operative to select a visualizer for displaying one or more files as a visualized object based on visualized identification information 210 associated with one or more data types of the files. For example, the enhanced GUI generator 106 may obtain a data type associated with a file from the file system 122 via the OS 114. The visualized identification information 210 may be obtained from a visualizer identification lookup table 200, which may be stored in system memory storage, e.g. the system memory 106, or any other types of suitable memory storage as generally known in the art. FIG. 2-1 illustrates an example of the visualizer identification lookup table 200. The visualizer lookup table 200 comprises associations between one or more data type values and corresponding visualizer identification information for visualizing file having a particular data type. As shown, each association identifies a data type value 240, e.g. JPEG, mp3, mpeg, txt, html, etc, and ID information 242 of a visualizer. The visualizer ID information may include the name of the visualizer, memory location where the visualizer is located, and any other desired information associated with the visualizer as generally known in the art. An example of updating the visualizer identification lookup table 200 by the enhanced GUI generator 116 is illustrated in FIG. 6. The visualizer identification lookup table 200 may be a dedicated file kept in a storage device operatively coupled to the CPU 102, or a database that stores visualizer identification information by the OS 114, such as Windows Registry on the Microsoft Window™ OS.

Referring back to FIG. 2, the enhanced GUI generator 106, in this example, also provides a list of file identification information 218, e.g. file names, path name and/or file node designations denoted by the file system 122, to the OS 114 together with the ID information 210 of visualizers selected based on the data types of the files as indicated by the visualized identification information 200. In response to receiving such information, the OS 114 instructs the selected visualizers, e.g. the visualizer 120, to generate graphical data 220 for the list of files to be visualized provided by the enhanced GUI generator 106. The OS 114 may provide information about the files to be visualized, such as file pointers of the files to be visualized, to the visualizer 120. In some examples, the OS 114 may just provide actual data of the files to be visualized to the visualizer 120. It is understood that, although in this example the enhanced GUI generator 106 causes selected visualizers, e.g. the visualizer 120, to display one or more files as visualized objects via the OS 114, in some other examples, the enhanced GUI generator 106 may directly communicate with, i.e. providing the list of files to be visualized to, to the visualizer 120 to cause the visualizer 120 to display the files as visualized objects without the intervention of the OS 114.

In this example, the visualizer 120 is operative to generate graphical data 220 representing a file as a visualized object.

A visualized object representation of a file is a graphical representation of the file indicating the content of the file as opposed to an abstract representation of a file, e.g. a file name or number. For example a file having a file type of JPEG, i.e. an image file, may be represented by an actual photo showing the graphical content of the JPEG file. Similarly, a file having a file type of mpeg, i.e. a video file, may be represented by an actual video clip, such as a flash video clip, showing the actual content of the video. It is understood that the above-mentioned desired visualized objects are presented for the purposes of exemplary and description only and not by limitation. Any suitable graphical representation of a file as a visualized object may be appreciated by those having ordinary skill in the art.

In this example the enhance GUI generator 116 is also operative to receive activation for one or more visualized objects as the enhanced GUI generator 116 monitors for action 206 from a user input device, e.g. the input device 132. Such activation may be a mouse click or selection, finger swipe, voice control command, stylus pointing, or any other suitable action known in the art to select and/or activate an object displayed in a graphical user interface. The activation may activate the file represented by visualized object as whole, e.g. activating a text document visualized as a real document with multiple pages by mouse selecting the entire document, or activate a particular data element within the file, e.g. mouse pointing to a page of the document to activate that page of the document without activating the entire document.

In response to such activation of one or more data elements represented by the visualized objects, the enhanced GUI generator 106 is further operative to generate graphical data 222 for displaying, in combination with the visualized objects, one or more tool interfaces associated with the activated visualized object based on tool interface identification information, e.g. tool interface identification information 212. The tool interface identification information 212 may be obtained by from a tool interface identification lookup table 202, as shown in this example. The tool interface identification lookup table 202 may be a dedicated file kept in a storage device operatively coupled to the CPU 102 (e.g. the system memory 106), or a database that stores visualizer identification information by the OS 114, such as Windows Registry on the Microsoft Windows™ OS.

FIG. 2-2 is a representation of tool interface identification lookup table 202 stored in any suitable memory storage, such as the system memory 106. The tool interface identification lookup table 202 may include one or more associations with the following values: a data type value 250, e.g. JPEG, mpeg, txt, html, etc, identification information value 252 for one or more programs (e.g. program 118) as identified being capable of processing data having the data type 250, and graphical data 254 defining tool interfaces for each of such programs. It is understood that tool interface identification lookup table 202 may include programs executed by the processor 102, such as programs 118 either as part of OS 114 or independent from OS 114, or programs executed by a remote processor other than the processor 102, i.e. programs provided by a cloud computing services. The program identification information 252 may include program name, file path where the program is connected to the file system, file node number, memory location where the program is loaded into to be executed by the processor 102 or any other suitable information as generally known in the art that is associated with a program to process data having a corresponding data type. Preferably, the graphical data information 254 that defines tool interface of the corresponding programs may include storage location, i.e. memory address or file path connected to a file system such as the file system 122, that stores graphical data representing the tool interface of the corresponding program. The graphical data information 254 may also include the actual graphical data that defines tool interface of the corresponding programs. An example of updating the tool interface identification lookup table 202 by the enhanced GUI generator 106 is shown in FIG. 6.

Referring back to FIG. 2, to determine tool interfaces to be displayed for the activated data elements represented by the activated visualized object, the enhanced GUI generator 106 obtains a data type for the activated data. Based on the received data type of the data elements activated, the enhanced GUI generator 106 selects a plurality of tool interfaces from different programs to be displayed for the activated data elements. In this example, the enhanced GUI generator 106 obtains tool interface data 214 for the selected interfaces from the tool identification lookup table 202. Upon obtaining the graphical data for the plurality tool interfaces selected for the activated data elements, the enhance GUI generator 106 then generates graphical data 222 for displaying the selected tool interfaces in combination with the visualized object, e.g. displaying the selected tool interfaces around the visualized object, by combining the tool interface data 214.

In this example, the enhanced GUI generator 106 is also operative to receive a selection, preferably via action 206 from the user input device 132, of tool icon from the tool interfaces displayed for an activated visualized object, wherein the selected tool icon represents a tool action associated with a program. In response to such selection, the enhanced GUI generator 106 is operative to manipulate one or more data elements represented by the activated visualized object using the selected tool action. As shown, to perform such manipulation, the enhanced GUI generator 106 sends a control command 216 to the OS 114 to process the data elements using a program whose tool action is selected. The control command 216 may also include instruction to the OS 114 to retain the control of the data elements as soon as the processing of the data elements is finished. Accordingly, the OS 114 may then send data 224 of the elements to a program, such as program 118, whose tool action is selected, for processing data 224 using the selected tool action. Upon finishing of such processing by the program 118, the OS 114 retains the control of the data elements from the program 118 according to the instructions of the enhanced GUI generator 116 via the control command 216.

Additionally, the OS 114 may also notify the enhance GUI generator 116 that the processing of the data elements has finished via control command 216. Upon receiving this notification, the enhanced GUI generator 116 may instruct the visualizer 120 to refresh a view of the activated visualized object based on a result of the processing of the data elements using the selected tool action. Accordingly, the visualizer 120 may obtain the updated data elements from the OS 114 and generate graphical data 220 into the frame buffer 128 to be further processed by the GPU 104.

In this example, the method and apparatus also receives configuration information 208 from the user input device 132. The configuration information 208 may include information that configures various properties of the enhanced GUI generator 106, such as but not limited to, user preference for programs to process data having one or more data types, e.g. use a preferred text editor to process data elements having a txt data type. The configuration information 208 may be stored in a configuration file 204 such as but not limited to a dedicated log file or a system database. The enhanced GUI generator 106, upon selecting tool interfaces to be displayed for one or more activated objects, may obtain the configuration information 208 and further selects the tool interfaces according to the configuration 208. It is understood that the configuration information 208 may also be predefined rules without user's inputs.

In addition, the OS 114 may also provide the enhanced GUI generator 116 information regarding a user's preference for processing data elements of desired data types and/or prior usage of one or more programs to process the data element represented by the activated visualized object. Base on this information, the enhanced GUI generator 116 may then determine a combination of tool interfaces, e.g. the tool interfaces associated with programs used most or preferred by the user are displayed at a position most conspicuous to the user.

Figure 3:
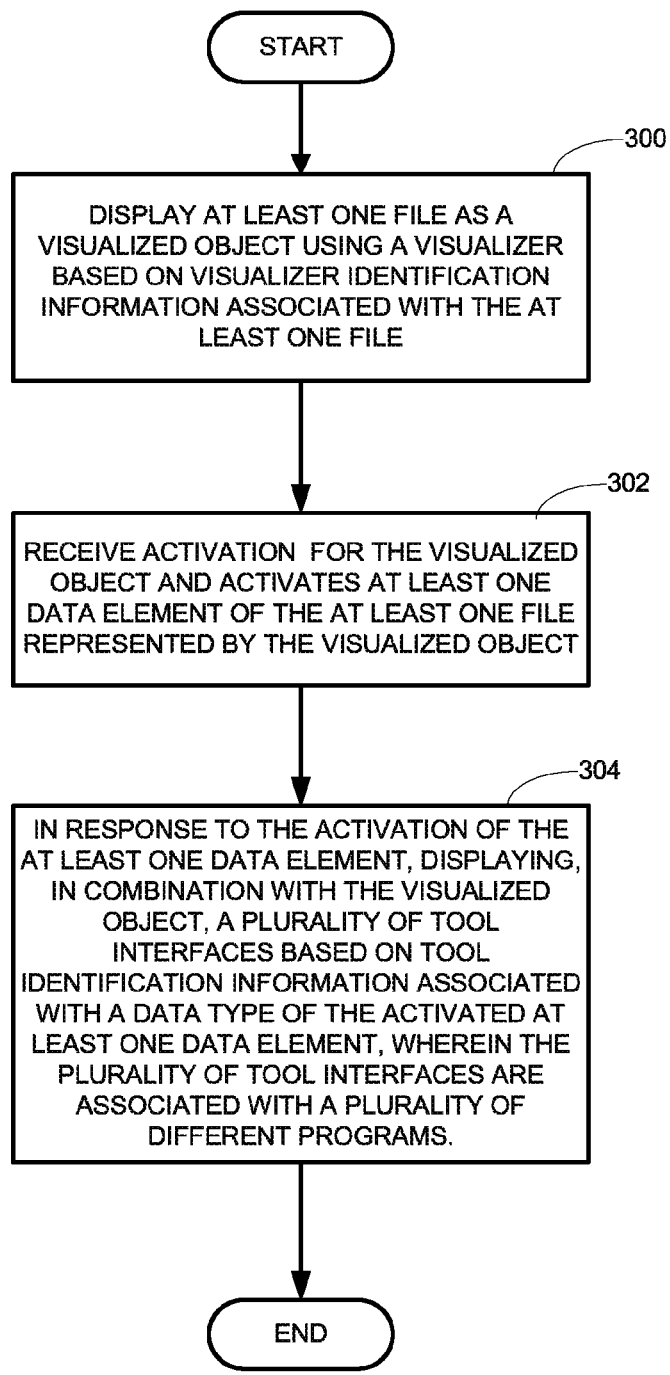
FIG. 3 is a flowchart illustrating one example of a method for providing an interface for a user to work with at least one file connected to a file system.

FIG. 3 illustrates one example of a method for providing an interface for a user to work with one or more files connected to a file system. It will be described with reference to FIGS. 1 and 2. In operation, at block 300, the enhanced GUI generator 106 displays one or more files as a visualized object using visualizer 120 based on visualizer identification information 210 associated with the at least one file. At block 302, the enhanced GUI generator 106 receives activation for the visualized object and activates at least one data element of the at least one file represented by the visualized object. At block 304, in operation, the enhanced GUI generator 106, in response to the activation of the visualized object, displays, in combination with the activated visualized object, a plurality of tool interfaces based on tool identification information 212, wherein the tool identification information 212 indicates an association of at least one data type of one or more data elements represented by the activated visualized object and data defining tool interfaces of different programs. The blocks 300, 302, and 304 are further illustrated in FIGS. 4, 5 and 6.

Figure 4:
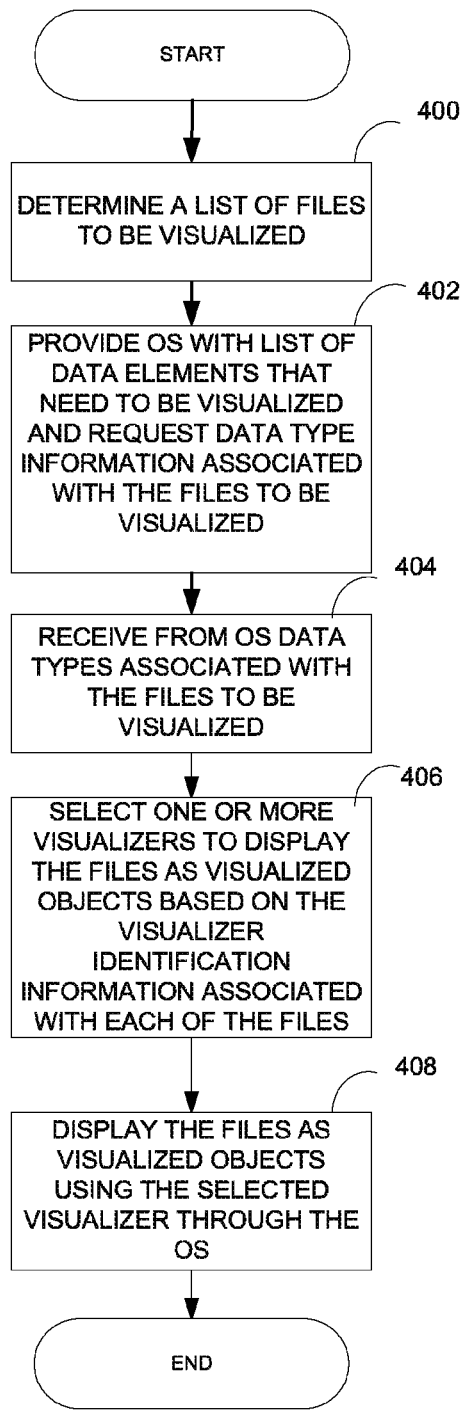
FIG. 4 is a flowchart illustrating another example of a method for providing an interface for a user to work with at least one file connected to a file system.

Referring to FIG. 4, in operation, at block 400, the enhanced GUI generator 106 determines a list of files to be visualized, e.g. based on user selection of one or more files connected to a file system (e.g. the file system 122) and/or a list of files visualized in the last execution session of the enhanced GUI generator 106. At block 402, the enhanced GUI generator 106 provides the OS 114 with the list of files to be visualized and requests file type information associated with the files to be visualized. At block 404, the enhanced GUI generator 106 receives from the OS 114 file types associated with the files to be visualized. For example, such file type may be doc, html, pdf, or any other file type associated with a file as generally known in the art. It is understood that, in other examples, blocks 400, 402 and 404 may be omitted in the processing and the file types associated with files to be visualized may be predefined and configured into the logic 108.

At block 406, in operation, the enhanced GUI generator selects one or more visualizers to visualize the files as visualized objects based on visualizer identification information 210. As described above, the visualizer identification information 210 indicates an association between a data type value and information 242 regarding the visualizer, e.g. the visualizer 120. The visualizer information may include but not limited to the name of the visualizer, file path of the visualizer connected to a file system (e.g. the file system 122), memory location where the visualizer is stored on a system (e.g. the system memory 106) and/or any other suitable information associated with a visualizer as generally known in the art. At block 408, the enhanced GUI generator 106 displays the files as visualized objects by causing the selected visualizer to generate graphical data for displaying the files as visualized objects through the OS 114. For example, the enhanced GUI generator 106 may provide the OS 114 with the information 242 of selected visualizers, and based on this information the OS causes the processor 102 to execute, for example, visualizer 120 using logic 112. The visualizer 120 may then generate graphical data 220 for displaying the files as visualized objects and store such graphical data 220 in the frame 128 for further processing by the GPU 104 to be displayed on the display device 130.

Figure 5:
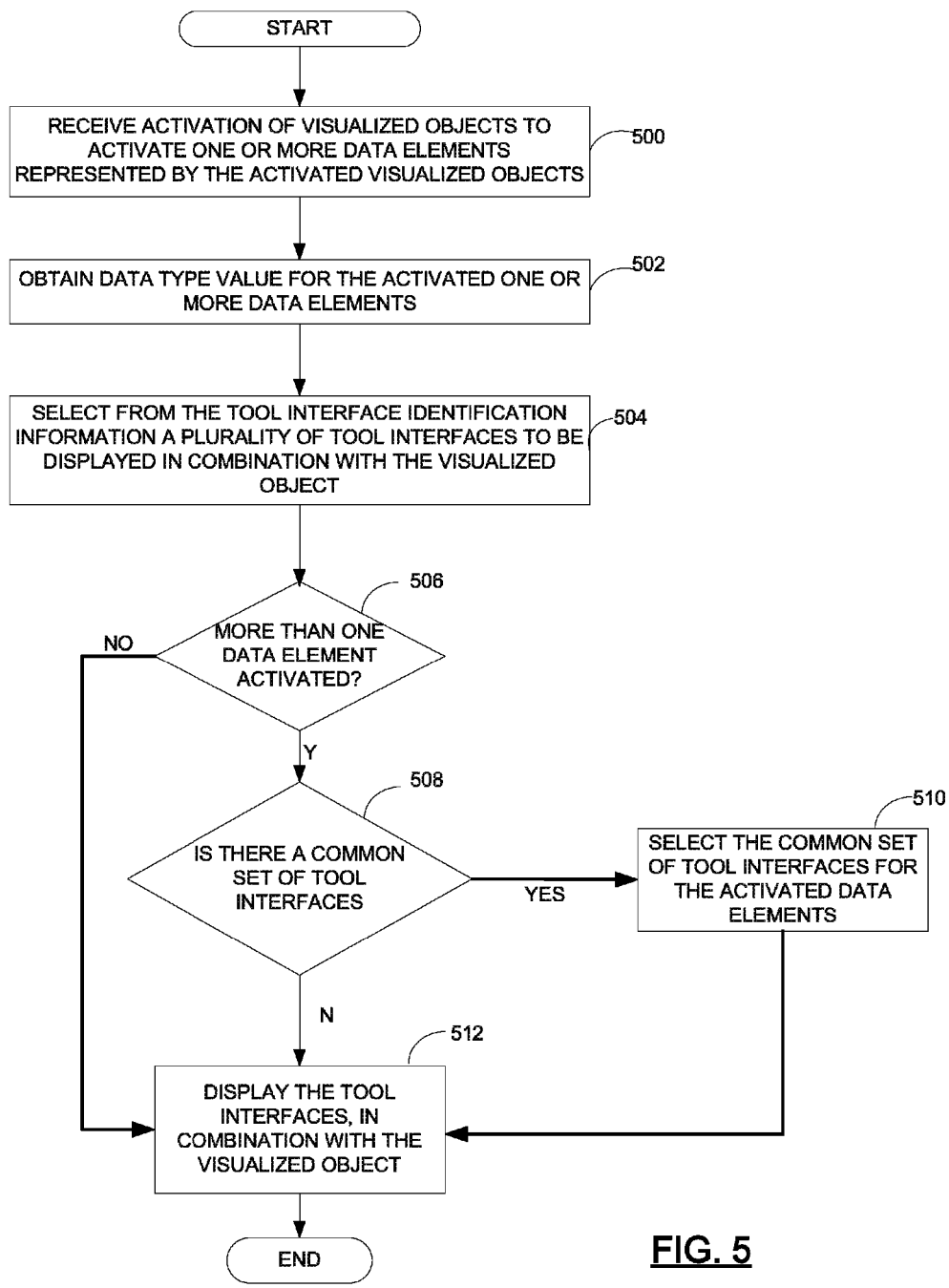
FIG. 5 is a flowchart illustrating yet another example of a method for providing an interface for a user to work with at least one file connected to a file system.

Referring to FIG. 5, in this example embodiment, the method for providing an interface for user to work with one or more files connected to a file system includes receiving activation of visualized objects to activate one or more data elements represented by the activated visualized objects. For example, such activation may be a mouse click on a visualized photo object of a JPEG file, and the data element activated by the mouse click is the graphic data of the JPEG file. In some other examples, such activation may be a mouse click on a page of a document visualized for a txt file and the mouse click activates the data element, i.e. the data block, of the activated page in txt file. At block 502, the method includes obtaining data type values for the activated one or more data elements. The data type values for the one or more activated data elements may be obtained from the OS 114 or the visualizer 120.

At block 504, in operation, the method includes selecting from the tool interface identification information 212 a plurality of tool interfaces to be displayed in combination with the visualized object. As described in FIG. 2-2, the tool interface identification information 212 indicates an association between a data type value and information of one or more programs and tool interfaces associated with the one or more programs. Accordingly, a plurality of interfaces associated with different programs may be selected based on the data type or data types of the one or more activated data elements.

Proceeding to block 506, the method recognizes, in this example, whether there are more than one data elements activated. In one embodiment in accordance with the disclosure, if it is recognized that only one data element is activated, the processing proceeds to block 510 to display the selected tool interfaces in combination with the visualized object for the activated data element. For example, the enhanced GUI generator 116 may generate graphical data 222 for displaying the selected tool interfaces and store such graphical data 222 in the frame 128 for the GPU 104 to display on the display device 130.

In another embodiment in accordance with the disclosure, if it is recognized more than one data elements are activated (e.g. 4 pages of a document visualized for a txt file are activated at the same time or portion of a photo and movie are activated at the same time), the processing proceeds to block 508. At block 508, the method further includes recognition whether there is a common set of tool interfaces for the activated plurality of data elements. To achieve this, the enhanced GUI generator 106 may compare graphical data of tool interfaces for different data types of the plurality of data elements and find a common set tool interfaces comprising tool actions that can operate the one or more data elements. For example, a set of common tool interfaces may be displayed for the activated photo and movie, such as cropping, up or down scaling, zooming, etc. In that case, the processing proceeds to block 510 and selects the common set of tool interfaces for the activated plurality of data elements. At block 512, the method further includes displaying tool interfaces in combination the visualized object as described above.

FIG. 6 is a flow chart showing one example of the enhanced GUI generator 106 updating and populating the visualizer identification information 210 and tool interface identification information 212 in the visualizer identification lookup table 200 and tool interface identification lookup table 202 respectively. At block 600, the enhanced GUI generator 106 receives information indicating a program, e.g. the program 118, is associated with a data type. This information may include the program's name, file path through which the program is connected to a file system, e.g. the file system 122, the memory location the program is loaded into, information about one or more visualizers, e.g. the visualizer 120, it provides to visualize file having the data type, and/or any other suitable information identifying the program as generally known in the art. As noted above, the program may be executed by one or more processors, e.g. the processor 102, which also execute the enhanced GUI generator 106, e.g. a local program either residing within or outside of a local OS, e.g. the OS 114. The program may also be executed by one or more processors remote to the processor 102 that executes the enhanced GUI generator 106, e.g. the program runs on a remote source, such as a remote computer server, data center, cloud server, etc. The enhanced GUI generator 106 may receive the information indicating an association between the program and a data type, for example but not limited to, from the OS 114 during the installation of the program, from the input by the user through the input device 132, or from a remote source through wired or wireless communication as generally known in the art.

At block 604, in operation, the enhanced GUI generator 106 recognizes whether the received information indicating an association between the program and the data type includes information indicating visualizer information for files having the data type. In one embodiment in accordance with the disclosure, the enhanced GUI generator 106 recognizes the received information regarding an association between the program and the data type includes information indicating a visualizer operative to visualize files having the data type and the processing proceeds to block 606. At block 606, in operation, the enhanced GUI generator 106 updates visualizer identification table 200 with the information regarding an association between a visualizer and the data type. An example of this association is described in FIG. 2-2.

At block 508, in operation, the enhanced GUI generator 106 recognizes whether the received information indicating an association between the program and the data type also includes information 212 regarding tool interfaces provided by the program. An example of this association is illustrated in FIG. 2-2. At block 510, if the enhanced GUI generator 106 recognizes that the tool interface identification information 212 is included in the received information indicating an association between the program and the data type, the enhanced GUI generator 106 updates the tool interface identification lookup table 200 with the tool interface identification information 212.

Figure 7:
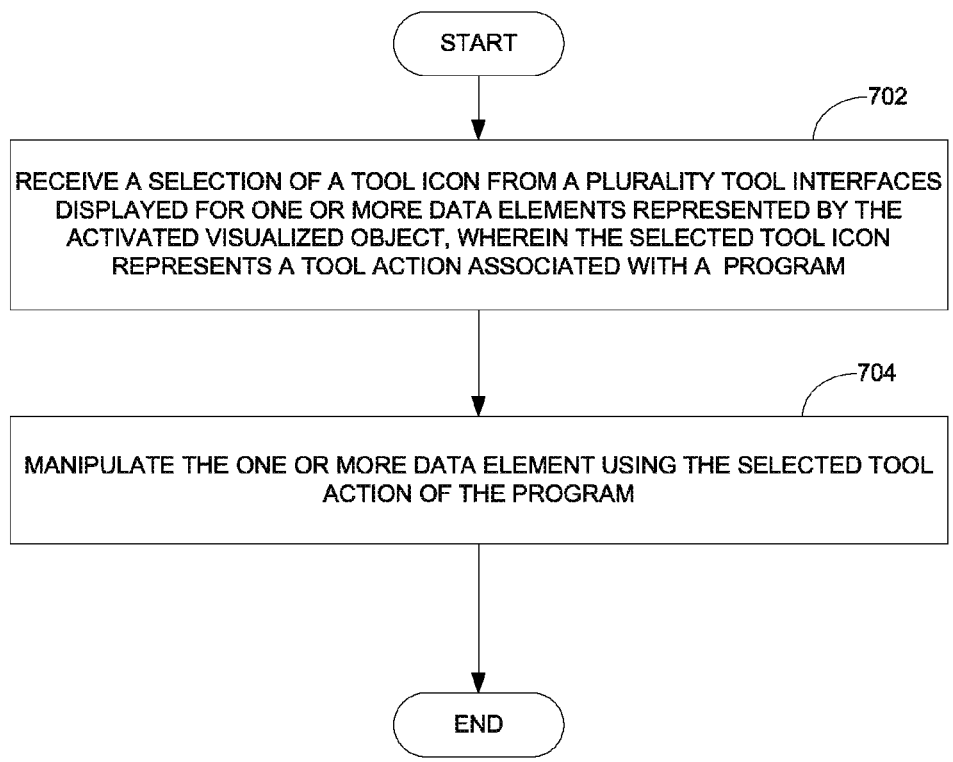
FIG. 7 is a flowchart illustrating one more example of a method for providing an interface for a user to work with at least one file connected to a file system.

FIG. 7 illustrates an example of a method and apparatus for providing an interface for a user to work with files connected to a file system. At block 702, in operation, the enhanced GUI generator 106 receives a selection of a tool icon from the tool interfaces displayed for one or more data elements represented by the activated visualized object. At block 704, in operation, the enhanced GUI generator 106 manipulates the one or more activated data elements using the selected tool action. The block 704 is further illustrated in FIG. 8.

Figure 8:
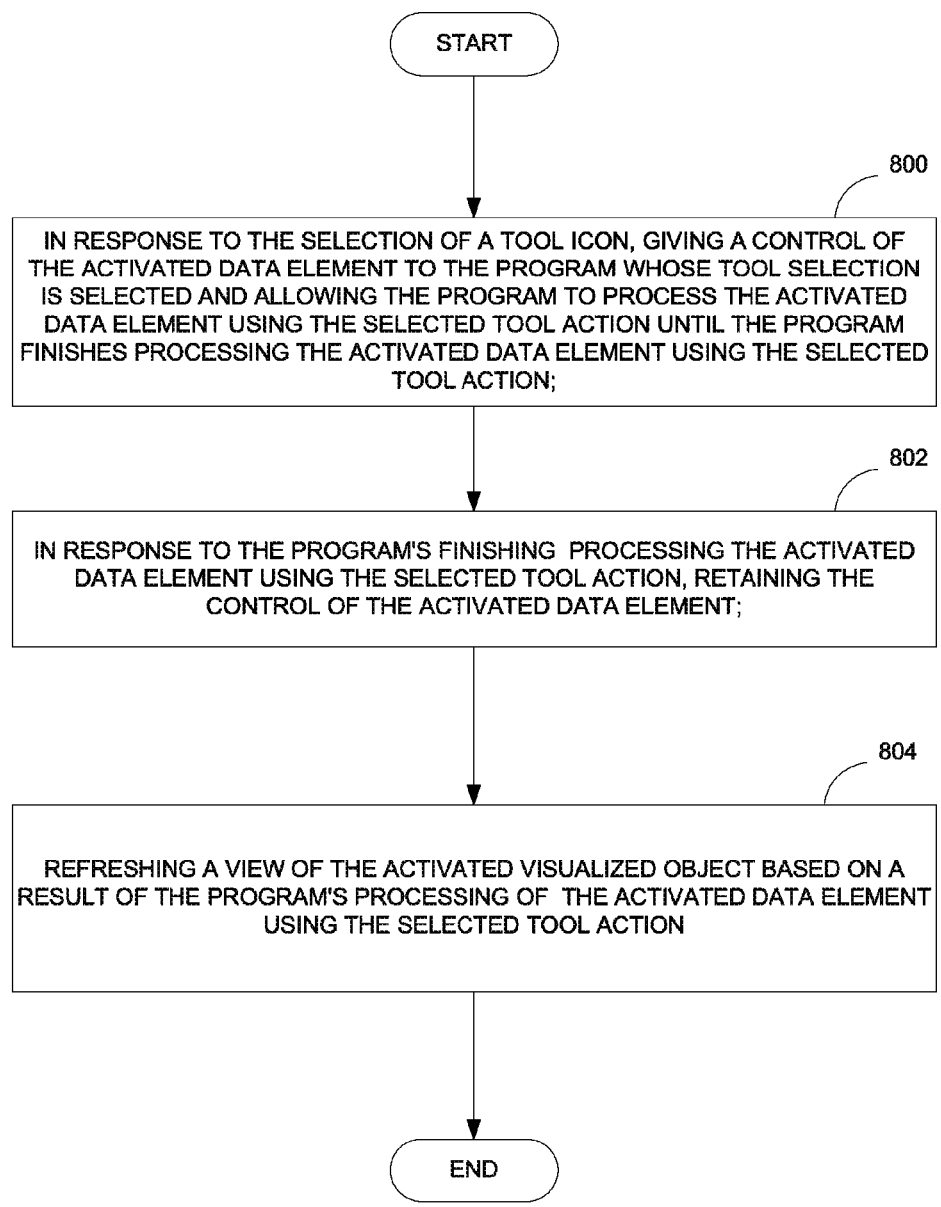
FIG. 8 is a flowchart illustrating yet another example of a method for providing an interface for a user to work with at least one file connected to a file system.

Referring to FIG. 8, in operation, at block 800, in response to a selection of a tool icon, the enhanced GUI generator 106 gives a control of the activated data element to the program whose tool selection is selected and allows the program to process the activated data element using the selected tool action until the program finishes processing the activated data element using the selected tool action. The enhanced GUI generator 106 may give such control to the program, e.g. program 118, through an OS, e.g. the OS 114. The enhanced GUI generator 106 may also issue a control command 216 to the OS 114 requesting that OS 114 to give a file pointer to storage device, e.g. a hard drive, or memory location where the activated data element may be retrieved. Through the control command 216, the enhanced GUI generator 106 may also request the OS to process the activated data element using the program whose tool action is selected. One example of such a control command may be "run tool Utlities:grascale.exe address 0x01210101-0x0120800". It is understood the above-described control command is presented for the purpose of exemplary description not by limitation and a person having ordinary skill in the art will appreciate any suitable control command to achieve the desired function described above.

In some other examples, more than one tool icons may be selected for the activated data element. For example, a print icon and an email icon may be selected for a data element represented by a document object. In those examples, the enhanced GUI generator 106 may then issue a control command instructing the OS 114 to print and email the activated data element of the document. The OS 114 may then process the activated data element by issuing a pipe command, e.g. "command#1 document|command#2 -s xx@xxx.com".

At block 800, the enhanced GUI generator 106 may further manipulate the activated data elements by instructing the OS 114, through control command 216, to retain the control of the activated data element as soon as the programs finish processing the activated data element. According to such instruction, the OS 114 may run the programs in through command-line evocation rather than launching the programs in an thick-application mode to process the activated data elements.

Proceeding to block 802, at block 802, the enhanced GUI generator 106 retains the control of activated data elements in response to the program's finishing processing the activated data elements using the selected tool action. For example, the enhanced GUI generator 106 may retain the control of a pointer to a storage location, e.g. the system memory 106, where the activated data elements are stored. At block 804, in operation, the enhanced GUI generator 106 may then refresh a view of the activated visualized object based on a result of the processing of the activated data elements by the selected tool action. For example, the enhanced GUI generator 106 may cause the visualizer 120, via a control command 216 to the OS 114 as described above, to refresh a view of the activated visualized object.

Figure 9:
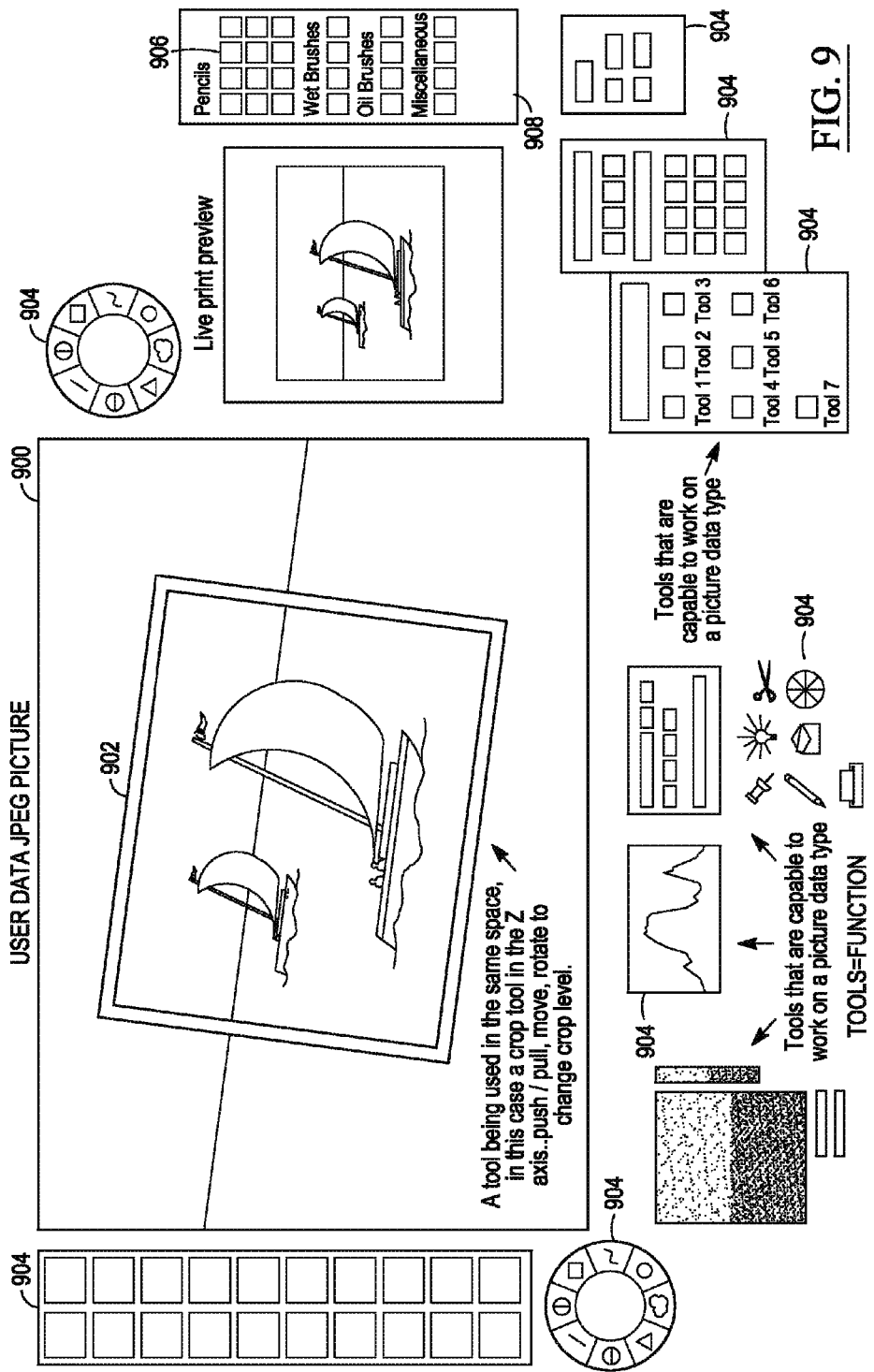
FIGS. 9-10 are exemplary illustrations of providing an interface for a user to work with at least one file connected to a file system.
Figure 10:
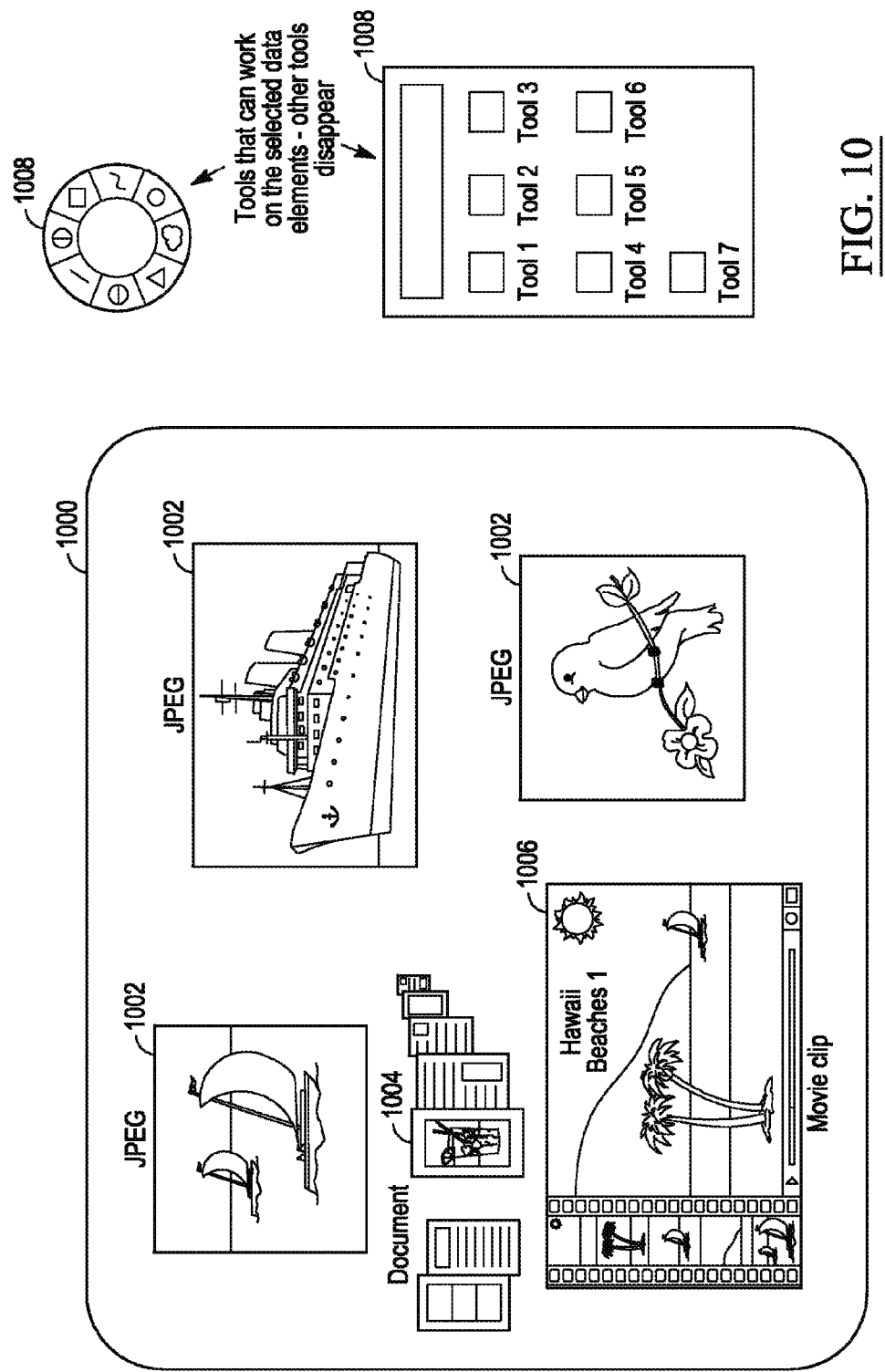

FIGS. 9-10 are illustrations of exemplary embodiments in accordance with the disclosure. FIG. 9 illustrates an example of providing interface for a user to work on an image file having a file type of, e.g. JPEG. In this example, the visualizer 120 is selected to generate graphical data, e.g. graphical data 220, for displaying the image file as a photo object 900 showing the actual content of the image file. In this example, the image file comprising data blocks, i.e. data elements, also having a JPEG data type. The enhanced GUI generator 106 selects the visualizer 120 to visualized image file based on the visualizer identification information 200 associated with the JPEG data type. In this example, the visualized photo object is activated, for example, by a mouse click, finger swipe, stylus pointing or any other suitable user action that activates an object displayed in a user interface. Accordingly, the enhanced GUI generator 106 generates graphical data 222 for displaying a plurality of tool interfaces 904 provided by different programs that are identified as being capable of processing data with a JPEG data type based on tool identification information 202 associated with the JPEG data type.

Also shown in this example is that a tool icon 906 representing a crop tool action provided by the tool interface 908 of a photo editing program (not illustrated in this example) is selected and applied to the area 902 within the visualized photo object 900. In response to this selection, the enhanced GUI generator 106 obtains information from the visualizer 120 regarding the area 902, i.e. information indicating data elements corresponding to the area 902, for example, length, memory location, file path, result buffer etc of the data elements. The enhanced GUI generator 106 may then issue one or more control commands 216 along with the information regarding the data elements instructing the OS 114 to process the data elements using the selected crop action of the photo editing program 908. Once the photo editing program 908 finishes processing the data elements 908, e.g. push, pull, move rotate to change a crop level, the enhanced GUI generator 106 retains the control of the data elements and causes the visualizer 120 to refresh the view of the visualized photo object 900 to indicate the cropped image in a separate visualized object 910. The data of the cropped image may be obtained by the visualizer 120 from a result buffer populated by the photo editing program upon finishing the data elements.

FIG. 10 illustrates an example of providing an interface for a user to select multiple data elements represented by corresponding visualized objects. In this example, as shown, the visualized objects 1002 are visualized photo objects showing actual graphical content of the corresponding images files. The visualized object 1004 is a visualized stack of paper representing a document file. The visualized object 1006 is a movie clip showing the first frame of a video file. In this example, the enhanced GUI generator 106 receives a mouse multi-selection that draws a box 1000 around the visualized objects 1002, 1004 and 1006. The enhanced GUI generator 106, in response to this multi-selection, activates data elements represented by the visualized objects 1002, 1004 and 1006. The enhanced GUI generator 106 may obtain information regarding the activated data elements from one or more visualizers that visualize these objects. For example, the enhanced GUI generator may obtain the length and storage location of activated data elements represented by each selected visualized object, data type of the activated data elements, and result buffer location associated with the activated data elements.

Base on the obtained information regarding the activated data elements, the enhanced GUI generator 106 may determine one or more common tool interfaces associated with the activated data elements represented by the selected visualized objects. In this example, the enhanced GUI generator 106 determines that an editing program having a tool interface 1008 can process the selected data elements. Accordingly, the enhanced GUI generator 106 generates graphical data 202 for displaying the tool interface 1008 on the display device 130.

Among other advantages, for example, the method and apparatus provides the ability to expose every possible available tool action all at once, resulting in a tool that resembles an exploded view diagram. Instead of exploring for a desired tool, the user can quickly discover the desired tool action from such an exploded view diagram of every possible tool action for one or more data elements. Accordingly, the method and apparatus improves user's experience to process data elements in a file by reduce information required upon the user to know what tool actions from which programs might be suitable to process the data element. In addition, the method and apparatus also provides an intuitive user interface that let user work on one or more data elements within a file without launching a program to do so. The method and apparatus also enables parallel data processing from a user's perspective by allowing the user to select more than one tool action to process more than one data element. Accordingly, the proposed techniques can improve user experience of working with a file by providing a more intuitive, user-friendly and efficient way to display and process data elements of the files. Other advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for providing an interface for a user to work with at least one file connected to a file system, the method comprising:
    displaying the at least one file as a visualized object using a visualizer based on visualizer identification information associated with the at least one file;
    receiving activation for the visualized object and activating at least one data element of the at least one file represented by the visualized object;
    in response to the received activation of the at least one data element, displaying, in combination with the visualized object, a plurality of tool interfaces from a plurality of different programs based on tool identification information associated with at least one data type of the activated at least one data element, wherein each of the plurality of tool interfaces is associated with a respective program of the plurality of different programs and selection of each of the plurality of tool interfaces enables manipulation of the activated at least one data element without launching the respective program; and
    wherein displaying, in combination with the visualized object, the plurality of tool interfaces from the plurality of different programs comprises:
    determining the plurality tool interfaces to be displayed for the at least one activated data element of the at least one file represented by the visualized object based on data defining association between the data type of the at least one activated data element and tool interfaces associated with the plurality of different programs, wherein the plurality of different programs are identified as being capable of processing data having the data type.

2. The method of claim 1 further comprising:
    receiving a selection of a plurality of visualized objects and activating a plurality of data elements of the files represented by the plurality of visualized objects; and
    in response to the activation of the plurality of the data elements, displaying, in combination with the plurality of visualized objects, at least one tool interface based on tool identification information associated with data types of the plurality of the activated data elements, wherein the at least one tool interface is associated with at least one program as identified capable of processing data elements having the data types of the plurality of the activated data elements.

3. The method of claim 1 further comprising:
    receiving a selection of a tool icon from the plurality of tool interfaces displayed for the activated at least one data element, wherein the selected tool icon represents a tool action associated with a program of the plurality of different programs; and
    in response to the selection of the tool icon, manipulating the activated data element using the selected tool action of the program of the plurality of different programs.

4. The method of claim 3 wherein manipulating the data element using the selected tool action comprises:
    in response to the selection of the tool icon, giving a control of the activated data element to the program whose tool selection is selected and allowing the program to process the activated data element using the selected tool action until the program finishes processing the activated data element using the selected tool action;
    in response to the program's finishing of the processing the data element represented by the activated visualized data element using the selected tool action, retaining the control of the data element from the program; and
    refreshing a view of the visualized object based on a result of the program's processing of the activated data element represented by the visualized object using the selected tool action.

5. The method of claim 1, wherein displaying, in combination with the visualized object, the plurality of tool interfaces from the plurality of different programs is further based on at least one of following:
    a determination of at least one of a user's prior history and preference to process a data element; and
    configuration information that indicates a preference for processing a data element.

6. The method of claim 1, wherein the tool identification information is updated by obtaining at least one of the followings:
    data indicating a program's ability to process data having a data type; and
    configuration information that associates a program with a data type.

7. The method of claim 1 further comprising:
    receiving selection of a plurality of tool icons from the plurality of tool interfaces displayed for an activated data element, wherein the selected tool icons represent a plurality of tool actions associated with at least one of the plurality of different programs; and
    in response to the selection of the plurality of tool icons, manipulating the activated data element using the plurality of selected tool actions of the plurality of different programs.

8. An apparatus operative to provide an interface for a user to work with at least one file located on a file system, the apparatus comprising:
    memory configured to store visualizer identification information and tool identification information associated with at least one data type; and logic comprising enhanced graphical user interface (GUI) generator operative to:
  select a visualizer for the at least one file as a visualized object using a visualizer based on visualizer identification information associated with the at least one file;
  receive activation for the visualized object and activating at least one data element of the at least one file represented by the visualized object;
  in response to the received activation for the activated at least one data element, generate graphical data for displaying, in combination with the visualized object, a plurality of tool interfaces from a plurality of different programs based on tool identification information associated with at least one data type of the activated at least one data element, wherein each of the plurality of tool interfaces is associated with a respective program of the plurality of different programs and selection of each of the plurality of tool interfaces enables manipulation of the activated at least one data element without launching the respective program; and
  wherein generating graphical data for displaying, in combination with the visualized object, the plurality of tool interfaces from the plurality of different programs comprises:
    determining the plurality tool interfaces to be displayed for the at least one activated data element of the at least one file represented by the visualized object based on data defining association between the data type of the at least one activated data element and tool interfaces associated with the plurality of different programs, wherein the plurality of different programs are identified as being capable of processing data having the data type.

9. The apparatus of claim 8, wherein the enhanced GUI generator is further operative to:
  receiving a selection of a plurality of visualized objects and activating a plurality of data elements represented by the plurality of visualized objects; and
  in response to the activation of the plurality of the data elements, generate graphical data for displaying, in combination with the plurality of visualized objects, at least one tool interface based on tool identification information associated with data types of the plurality of the activated data elements, wherein the at least one tool interface is associated with at least one program as identified capable of processing data elements having the data types of the plurality of the activated data elements.

10. The apparatus of claim 8, wherein the enhanced GUI generator is further operative to:
  receive a selection of a tool icon from a plurality of tool interfaces displayed for the activated at least one data element, wherein the selected tool icon represents a tool action associated with a program; and
  in response to the selection of the tool icon, manipulate the activated data element using the selected tool action of the program.

11. The apparatus of claim 10, wherein manipulating the data element using the selected tool action comprises:
  in response to the selection of the tool icon, give a control of the activated data element to the program whose tool selection is selected and allowing the program to process the activated data element using the selected tool action until the program finishes processing the activated data element using the selected tool action;
  in response to the program's finishing of the processing the data element represented by the activated visualized data element using the selected tool action, retain the control of the data element from the program; and
  refresh a view of the activated visualized object based on a result of the program's processing of the data element represented by the activated visualized object using the selected tool action.

12. The apparatus of claim 8, wherein displaying, in combination with the visualized object, the plurality of tool interfaces from the plurality of different programs is further based on at least one of following:
  a determination of at least one of a user's prior history and preference to process a data element; and
  configuration information that indicates a preference of processing a data element.

13. The apparatus of claim 8, wherein the tool identification information is updated by obtaining at least one of the followings:
  data indicating a program's ability to process data having a data type; and
  configuration information that associates a program with a data type.

14. The apparatus of claim 8 wherein the enhanced GUI generator is further operative to:
  receive selection of a plurality of tool icons from the plurality of tool interfaces displayed for an activated data element, wherein the selected tool icons represent a plurality of tool actions associated with at least one of the plurality of different programs; and
  in response to the selection of the plurality of tool icons, manipulate the activated data element using the plurality of selected tool actions of the plurality of different programs.

15. The apparatus of claim 8 further comprising:
  a second logic comprising one or more visualizers operative to generate graphical data for display the at least one file as a visualized object; and
  a display operative to display the graphical data generated by the one or more visualizers and the enhanced GUI generator.

16. A non-transitory computer readable medium comprising executable instructions that when executed by one or more processors causes one or more processors to:
  display at least one file as a visualized object using a visualizer based on visualizer identification information associated with the at least one file;
  receive activation for the visualized object and activating at least one data element of the at least one file represented by the visualized object;
  in response to the received activation of the at least one data element, display, in combination with the visualized object, a plurality of tool interfaces from a plurality of different programs based on tool identification information associated with at least one data type of the activated at least one data element of the at least one file represented by the visualized object, wherein each of the plurality of tool interfaces is associated with a respective program of the plurality of different programs and selection of each of the plurality of tool interfaces enables manipulation of the activated at least one data element without launching the respective program; and
  wherein the tool identification information comprises:
    data defining an association between a data type and tool interface of at least one program, wherein the at least one program is identified as being capable of processing a data element having the data type.

17. The non-transitory computer readable medium of claim 16 further causes one or more processors to:
- receive activation for a plurality of visualized objects and activating a plurality of data elements represented by the plurality of visualized objects; and
- in response to the activation of the plurality of the data elements, display, in combination with the plurality of visualized objects, at least one tool interface based on tool identification information associated with data types of the plurality of the activated data elements, wherein the at least one tool interface is associated with at least one program as identified capable of processing data elements having the data types of the plurality of the activated data elements;
- receive selection of at least one tool icon from a plurality of tool interfaces displayed for at least one activated data element, wherein the selected tool icon represents at least tool action associated with at least one program; and
- in response to the selection of the tool icon, manipulate the activated data element using the selected tool action of the program.

\* \* \* \* \*